United States Patent [19]

Lefebvre

[11] 4,377,289

[45] Mar. 22, 1983

[54] FURNACE ELECTRODE SEAL ASSEMBLY

[75] Inventor: Jean J. Lefebvre, Tracy, Canada

[73] Assignee: Qit-Fer et Titane Inc., Quebec, Canada

[21] Appl. No.: 332,339

[22] Filed: Dec. 18, 1981

Related U.S. Application Data

[63] Continuation-in-part of Ser. No. 142,839, Apr. 22, 1980, Pat. No. 4,306,726.

[51] Int. Cl.[3] .......................... F16J 15/06; H05B 7/12

[52] U.S. Cl. .......................................... 277/12; 277/16; 277/22; 277/30; 277/116.4; 373/95

[58] Field of Search ....................... 277/12, 16, 22, 30, 277/31, 116.4, 116.6, 116.8, 226; 373/95

[56] References Cited

U.S. PATENT DOCUMENTS

| | | | |
|---|---|---|---|
| 2,243,096 | 5/1941 | Hardin | 373/95 |
| 2,871,278 | 1/1959 | Sandvold | 373/95 |
| 3,709,506 | 1/1973 | Beerman | 277/12 |

FOREIGN PATENT DOCUMENTS

| | | | |
|---|---|---|---|
| 1040677 | 9/1966 | United Kingdom | 373/95 |

*Primary Examiner*—Robert S. Ward, Jr.
*Attorney, Agent, or Firm*—Brisebois & Kruger

[57] ABSTRACT

An electric furnace electrode seal assembly includes a seal ring mounted on the furnace adjacent the electrode opening. The seal ring is stationary and supports a telescoping arrangement of a plurality of cylindrical sealing glands which can be air or convection cooled and extend upwardly along the electrode from the seal ring. The largest diameter gland can be located on top of the seal ring and the uppermost gland can be the smallest diameter and is supported by the electrode holder. Seals are interposed respectively between adjacent glands and these seals permit vertical telescopic movement as well as lateral movement of and slight tilting of the glands relative to each other. The bottom gland can slide on the seal ring to provide for additional lateral movement of the electrode and seal assembly. The assembly prevents leakage of gases and acts as a heat shield.

16 Claims, 8 Drawing Figures

FURNACE ELECTRODE SEAL ASSEMBLY

RELATED APPLICATIONS

This is a Continuation-In-Part of Application Ser. No. 142,839, filed April 22, 1980, and now U.S. Pat. No. 4,306,726, and the disclosure thereof is incorporated herein by reference.

FIELD OF THE INVENTION

This invention relates to an improved telescoping seal assembly for an electric arc furnace.

More particularly, the invention relates to an improved seal assembly for an electric arc furnace of the type in which an electrode extends through an opening in the furnace to smelt or melt the contents of the furnace.

More specifically, the invention relates to a telescoping, air or convection cooled seal assembly particularly useful as an electrode seal for an electric furnace of the type in which the electrode is raised and lowered during operation of the furnace to maintain the electrode at a predetermined position relative to the level of the charge or melt in the furnace.

BACKGROUND OF THE INVENTION

Electric furnaces are widely used for various metal smelting and refining operations. The typical furnace may include a plurality of carbon or graphite electrodes which extend through openings, usually in the roof of the furnace to a location adjacent the level of the melt in the furnace. Typically, the furnace can include several electrodes.

When molten material is tapped from the furnace, the level within the furnace lowers and it is necessary to lower the electrodes to follow the level of the melt in the furnace. Then, when additional charge is added to the furnace, the electrodes must be retraced to maintain them at the proper distace form the melt in the furnace. As the arc from the electrodes smelts or melts the furnace charge, the ends of the electrodes erode. Further, the massive electrodes are constantly lowered and lifted automatically by suitably controlled winches or other drive means to maintain proper operating conditions.

To avoid the escape of hot dust laden and frequently noxious gases with the corresponding environmental hazards and loss of heat and efficiency of the furnace, it is necessary to provide a good seal between each electrode and the furnace as well as between other moveable elements, such as loading chutes, and the furnace. Unless a reasonably gas tight seal is maintained, rapid erosion, and/or oxidation, including necking in or the electrode occurs along that length of the electrode or other moveable which extends through the opening in the furnace roof. Such erosion in the case of an electrode not only weakens the electrode, with the danger that the lower end of the electrode can break off, but also reduces the diameter of the electrode with the result that the current carrying capacity of the electrode is substantially reduced. In addition, the size of any opening between the electrode and the furnace increases as the electrode erodes which allows even more gas to escape. Tests show that typical temperatures of gases when flowing outwardly from a furnace through the annulus between the furnace opening and the electrode are on the order of 3,000° F., and hence, the electrode as well as surrounding structures and equipment can be damaged by the escaping hot gases.

Because of the large current carried by each electrode, the heat of the furnace and the vibration caused by the arc between the end of the electrode and the furnace melt, it is virtually impossible to provide a reliable close fitting seal without danger of damage to the electrode or the roof of the furnace through which the electrode extends. In addition, as a result of conditions within the furnace, the axis of the electrode may tilt slightly which presents further problems with a close fit of the electrode in the furnace opening. Further, there is no known seal material which can withstand the high temperatures between the electrode surface and the furnace roof.

As previously explained, the electrodes are frequently lifted and lowered during operation of the furnace. When the electrode, or other moveable element is lowered, it is also subjected to slag splashing from the furnace. If a close fitting opening or seal is provided at the furnace, slag on the outer surface of the element can damage the seal when the element is withdrawn.

While in many instances the pressure within the furnace is greater than atmospheric, there are times when below atmospheric pressure exists in the furnace. Such conditions may arise where especially noxious gases are emitted by operation of the furnace and such gases must be removed from the furnace by vacuum to avoid operator or worker hazards, and leakage of air into the furnace is usually undesirable.

It is also desirable to maintain the region of the outside of the furnace near the electrode reasonably cool to avoid possible damage to control and manipulating equipment, and to reduce hazards to the workers.

While the electrode seal of application Ser. No. 142,839, is quite durable, satisfactory, and effective, providing the water required for cooling the glands requires piping, flexible hoses, and plumbing which are expensive and space consuming, and disposal of the water used for cooling can be an environment problem.

Consequently, there is a need for a reliable arc furnace seal which seals under conditions of both positive and negative pressures in the furnace, which in no way interferes with adjustment or manipulation of, for example, the electrode, which preferrably requires little or no water cooling, and which requires minimal maintenance. In accordance with this invention, such a seal is provided.

THE PRIOR ART

In U.S. Pat. No. 3,709,506 an elongated seal is provided between a furnace electrode and a frusto conical shell, by packing a high temperature resistant flexible packing such as asbestos into the space between the shell and the surface of the electrode. While such an arrangement has worked reasonably well, it is difficult to maintain a wholly gas-tight seal because of the sliding movement of the electrode relative to the packing.

U.S. Pat. Nos. 2,243,096 and 2,871,278 each disclose seal arrangements with relatively moveable sections, but in which the ultimate sealing to prevent passage of gases is effected by the presence of a liquid in one or more chambers of the seal. Where the liquid such as water is the primary seal medium, the permissible pressure for vacuuming the furnace is limited, and such seals present the danger of steam explosion if water from the seals enters the furnace.

SUMMARY OF THE INVENTION

The improved electric furnace seal of the present invention includes a lower seal ring assembly which extends radially outwardly of the furnace opening and has an inside diameter slightly greater than the diameter of the electrode. A telescoping seal assembly composed of a plurality of cylindrical glands which can be liquid, air or convection cooled, extends around the electrode and suitable seals or packing are disposed between the respective glands to permit axial movement relative to each other. The packing is flexible and spring biased or otherwise energized to provide for axial movement of the electrode through the sections of the telescopic seal assembly and to compensate for wear of the packing. The telescopic seal assembly is so arranged relative to the lower seal ring that the telescopic assembly can move radially and therefore the telescopic assembly is able to follow the normal lateral or transverse movement of the electrode. The lower seal ring and the upper telescopic assembly of glands are formed of metal, stainless steel being preferred because of its non-magnetic characteristics and its resistance to corrosion. The inside of the upper gland of the assembly can be insulated with a high temperature resistant insulation.

The upper seal assembly as heretofore referred to comprises preferably concentric and telescoping gland members. The larger diameter gland is attached to the lower or first seal ring with a gland of intermediate diameter, when used, interposed between the larger diameter gland and the upper smallest diameter gland which attaches to the electrode holder. The glands are double-walled and include baffle plates therein when water cooled, which function to direct the cooling water through the gland to attain uniform cooling. Convection or air cooled glands can have external cooling fins and interior insulation.

An annular slot is provided at the upper end of each of the glands of the telescopic assembly and received in each slot is a seal which can be braided asbestos packing. The seal is in the shape of an annular ring and seats in the slot in surrounding relationship to the outside surface of the next adjacent upper gland. The seal or packing is therefore sealing against an external surface of the next gland and is itself mounted at the upper end of a gland so it is not exposed to direct radiation from the furnace. In order to increase the degree of sealing provided by these seals, there is arranged about the periphery of the seal a spring or other energizer which tends to force the seals radially inwardly while allowing outward radial expansion.

The annular slot in the glands for receiving the asbestos seal is radially enlarged so that each seal and its spring can move radially in the slot. By virtue of this arrangement, each such seal can slide in its slot to a limited extent thereby providing for limited radial movement between the several glands of the telescoping assembly. Advantageously, each such slot is at the end of a gland and is closed by an end plate comprised of two diametrically split sections fastened to the top of the gland so that the seal is readily exposed for maintenance by removing this end or cover plate.

Each gland has a diameter greater than the diameter of the electrode so that even the smallest gland has its inside surface spaced from the outside surface of the electrode. In one preferred embodiment where the upper gland is the smallest diameter gland, and is water or air cooled, ther is some spacing between the outside surface of the electrode and the inside surface of the gland, so that the gland does not directly contact the electrode, yet assists in maintaining the upper portion of the electrode cooled by virtue of the gland itself being water cooled.

Where the glands are convection or air cooled the smallest (upper) gland has an inside diameter somewhat greater than the diameter of the electrode and is insulated on its inside surface with high temperature resistant insulation, such as FIBROFRAX. Such insulation has its inner surface spaced from the outside surface of the electrode.

Advantageously, the upper gland is supported by the electrode holder via the electrode shoe clamp and a bracket arrangement which thus suspends the upper gland. To seal the upper gland relative to the electrode, an axially compressible seal can be provided between the upper end of the upper gland and a lower face of the electrode shoe. By virtue of this arrangement and the suspension bracket, the seal can readily be compressed axially to the required extent by simply tightening nuts on screws of the suspension bracket to lift the gland upwardly toward the shoe. A circumferential seal can also be used to seal the upper gland directly to the electrode.

The several glands are each cylindrical. To facilitate assembly, each gland can be made of two half shells which can be assembled around the electrode, or can be preassembled and then telescoped into the next adjacent gland. It is necessary, however, for the upper gland to lift the lower gland during telescoping of the glands and for this purpose inter-engaging lugs or lips are provided between the bottom of the upper gland and the top of the intermediate gland, when used. These lugs are so arranged that the two gland can be rotated to a position in which the lugs clear each other and after one gland is inserted into the other, it is again rotated to a position in which the lugs overlap so that axial separation of the glands is prevented and the upper gland lifts the lower gland when the respective lugs engage. To prevent the glands from again rotating to a position in which they can axially separate, means are provided to prevent rotation of the glands relative to each other.

Accordingly, it is an object of the present invention to provide an improvement in electric arc furnaces wherein a large diameter electrode extends through an opening in the furnace, the improvement being a unique telescoping electrode seal assembly.

Another object of the present invention is a unique seal for the electrode of an electric furnace wherein a telescopic assembly is provided including at least two and preferably three concentric gland members, although more can be used, each of which is water, air, or convection cooled.

A further object of the present invention is to provide an annular packing for each of the telescopic glands of the seal and wherein that packing includes a spring biased means to force the packing radially inwardly yet to allow the packing to expand outwardly if need be.

Another object is an insulated upper gland with a seat for the packing at the upper end of the gland where the packing engages the outer surface of an adjacent gland or the electrode, and in which the insulation shields the packing from direct furnace radiation.

A still further object of the present invention is to provide in a telescopic seal for an electric furnace a series of stop members in each of the glands of the telescopic assembly, which stop members prevent three or more glands of the assembly from pulling apart axially of the electrode which they surround.

Yet another object and feature of the present invention is to insulate the seal holding slot of a gland to reduce the temperatures to which a seal is exposed.

An additional object is a telescoping furnace electrode seal assembly in which the telescoping glands can also move laterally relative to each other to compensate for vibration of the electrode.

These and other features, advantages and objects of the invention will become apparent with reference to the drawings and to the detailed description which follows:

IN THE DRAWINGS

DETAILED DESCRIPTION

Figure 1:
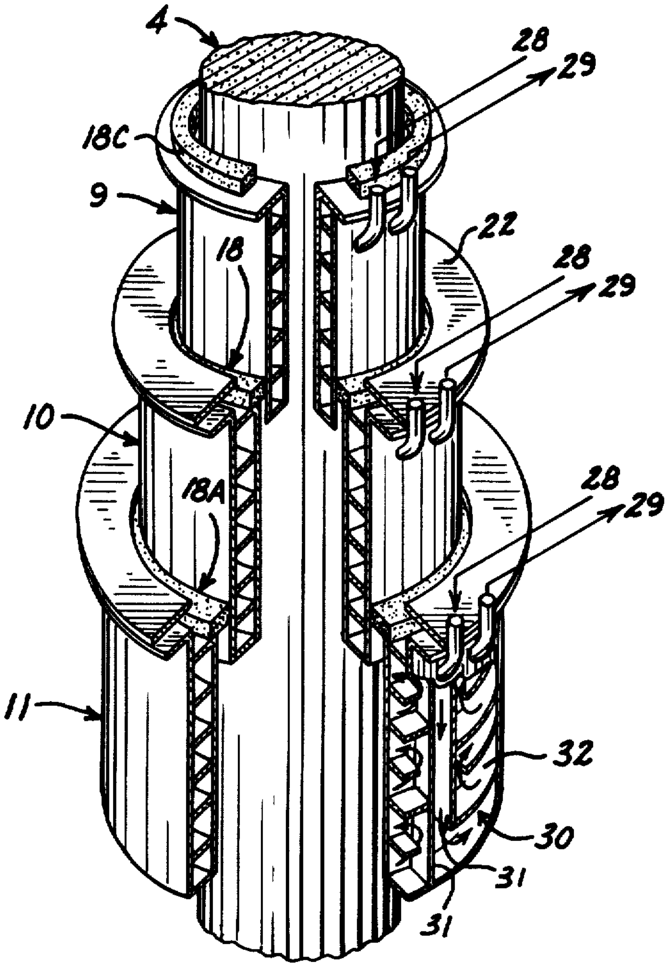
FIG. 1 is a pictorial view with portions cut away showing an electrode with the telescopic seal of this invention mounted thereon.
Figure 2:
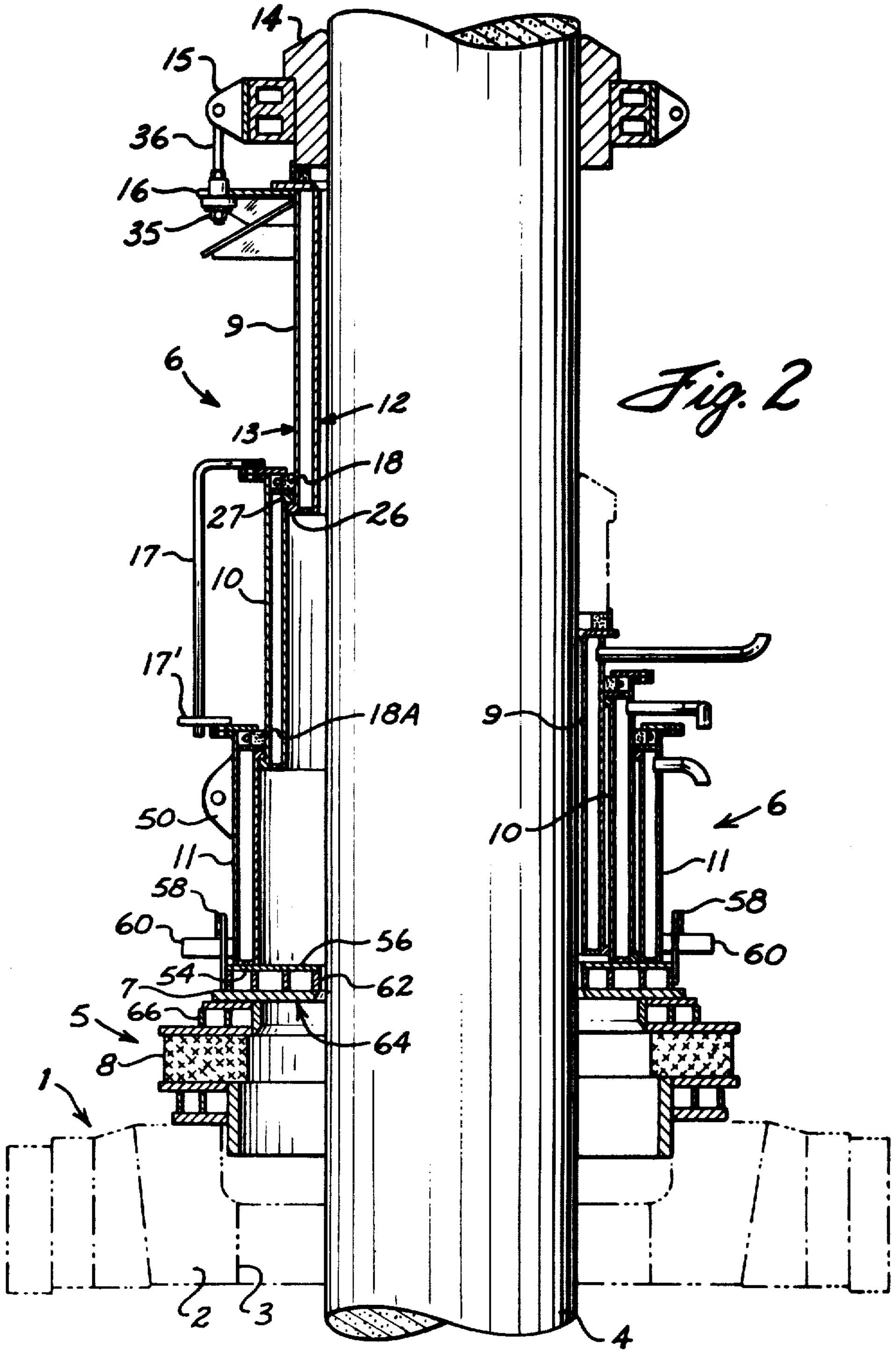
FIG. 2 is a front view in elevation and partly in section showing the seal assembly extended on one side and retracted on the other side and also showing a portion of the furnace roof through which the electrode extends.

As shown at FIGS. 1 and 2, there is an electrode surrounded by a telescoping gland assembly.

With reference to FIG. 2, there will be seen a furnace roof 1 comprise of a refractory material including brick work 2 defining a circular opening 3 through which an electrode 4 extends from a location outside of the furnace. Supported at the upper end of opening 3 and seated on the brick work 2 adjacent the opening 3 is a stationary seal assembly 5 which extends around the electrode 4 and is concentric with the axis of the opening 3. Seated on the stationary seal assembly 5 is a telescopic and laterally movable seal assembly 6. Seal assembly 5 includes a laterally movable liquid cooled seal ring 7 which slides on a stationary water cooled seal ring which seats on an insulating support ring 8 which can seat on another water cooled ring.

The improvement of the present invention resides in the movable assembly 6 and its sealing of the electrode relative to the furnace. This assembly 6 comprises a plurality of preferably three telescoping gland members 9–11 each of which includes an inner wall 12 and an outer wall 13. Each of the glands 9–11 is of cylindrical shape and hollow to be received around electrode 4 and these glands 9–11 are nested one with respect to the other in telescopic fashion. Upper gland 9 is of the smallest diameter and telescopes within gland 10 which is of intermediate diameter. The lower gland 11 is of larger diameter than the intermediate gland 10 which telescopes within gland 11.

An electrode shoe 14 is clamped to the upper end of electrode 4 and includes an electrode holder or clamp 15 which is attached to the upper gland 9 by means of arms 16. It should be apparent that when the electrode 4 is moved upwardly, the glands 9–11 extend axially with it from their position as seen on the right side of FIG. 2 to their extended position as seen on the left side of FIG. 2. Lowering of electrode 4 again nests and telescopes the glands 9–11. Because of electrode movement, vibration and magnetic fields, there is a tendency for the intermediate gland 10 to revolve about the axis of the electrode 4, and therefore to prevent this and stabilize the telescopic seal system 9–11, there is provided a locking rod 17 which is attached to the upper end of gland 10 and projects downwardly between parallel spaced apart guide bars 17' through which the rod can slide.

Figure 5:
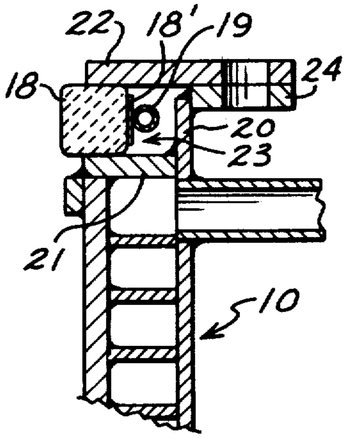
FIG. 5 is an enlarged view in axial section of an intermediate gland.

With reference now to FIG. 5, each of the glands 10 and 11 include at their upper end a packing or seal element 18 which comprises asbestos rope encircled by a flat strap 18' and a spring 19. The effect of spring 19 is to compress the seal 18 inwardly to produce a good seal against the outer surface of the adjacent inner gland but which allows the seal to expand. From FIGS. 2 and 5, it is to be noted that seal 18 is mounted at the upper end of gland 10 and contacts the outer surface of gland 9. Seal 18A, on the other hand, is at the upper end of gland 11 and surrounds and contacts the outer surface of gland 10. In each case, the springs 19 force the seals 18 and 18A inwardly to prevent leakage between glands 9–11.

With reference again to FIG. 5, plates 20 and 21 form a seat for receiving both the seal 18 and the back-up strap and spring 19. A diametrically split ring 22 defines an annular slot in which the seal is located. Ring 22 can be easily removed in order to service seal 18 or spring 19. Flange 24 on plate 20 provides for securing the halves of ring 22 to the gland. The strap 18' which extends around the outer periphery of the packing distributes the radially inward force of the spring 19 along the outside of the packing. The packing 18 is of a height to be a close sliding fit between plates 21 and 22. Further, it will be noted that the annular slot 23 is radially larger than the spring and seal so that the seal can move radially to a limited extent permitting limited radial movement between adjacent glands.

Figure 4:
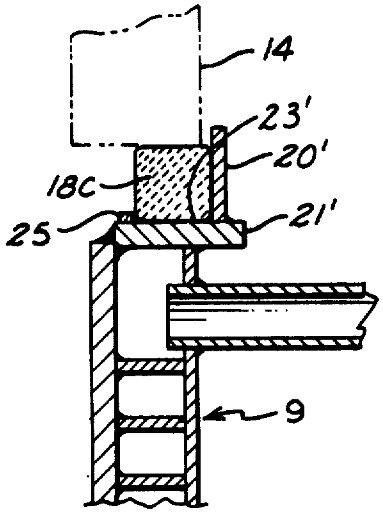
FIG. 4 is a partial view in axial section of the upper gland of the assembly showing its packing receiving region.

FIG. 4 shows the upper end of the upper gland 9 and its seal support. Spaced apart at 40° intervals on plate 21' are locating lugs 20' in the form of short upright plates. Seal 18C seats on the flat top surface 23' of top plate 21'. Spaced outwardly of the inner edge of plate 21' is a ring 25 of short axial extent relative to the gland and which spaces seal 18C from the inside surface of the gland.

With reference to FIG. 2, it is believed evident that tightening the bolts 35 of the mounting bracket 15 lifts glands 9 upwardly so that seal 18C is compressed axially between the top surface 23' of plate 21' and the bottom surface of the shoe assembly 14. Further, it will be noted that the threaded studs 36 are pivotally connected to permit centering gland 9 relative to the shoe assembly. The lugs 20' are diametrically spaced slightly greater than the shoe assembly to assure that the gland is centered with respect to the shoe and correspondingly with respect to the electrode.

It will be noticed, with reference to FIG. 2, that the inside surface of gland 9 is spaced from the outside surface of electrode 4, when the gland is mounted on the electrode by the mounting bracket 15. This arrangement avoids any direct contact between the hot outside surface of the electrode and the inside of the gland, and by virtue of the liquid cooling of the gland, preferably with cool water, the portion of the electrode surrounded by gland 9 is cooled to a certain extent.

Figure 3:
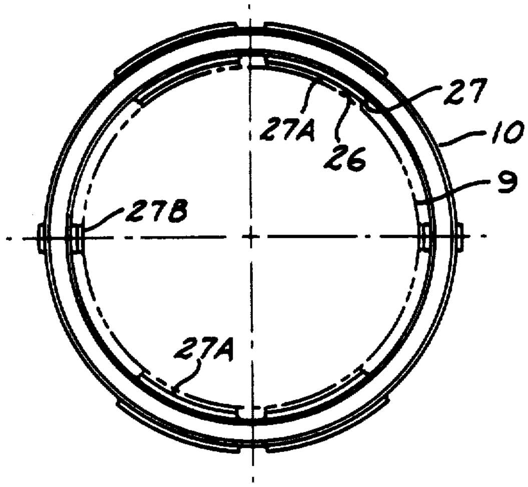
FIG. 3 is a view in plan of the intermediate gland showing the arrangement of stop members or lugs for preventing axial disengagement of the glands.

Each of the glands 9–11 is fabricated, for example, by welding, to form a hollow circular shell. The outside wall of the glands 9 and 10 presents a smooth surface for good sealing of the respective seals 18 and 18A. The glands are first separately fabricated and are then assembled in the telescopic form shown at FIG. 2. As is believed evident, as gland 9 is drawn upwardly, an array of lugs 26 on its outer surface, and near its lower end, engages an array of lugs 27 on the inner surface of gland 10 near its upper end. After these lugs engage, gland 10 is lifted upwardly by gland 9, and there is then relative movement between glands 10 and 11. The lugs 26 and 27 are connected to the respective glands 9 and 10 in the array shown at FIG. 3. The circumferential extent of the several sections 27A and 27B of these lugs is less than 180° to permit assembling gland 9 to gland 10 by first rotating the gland 9 90° from its working position, inserting the lower end of gland 9 into gland 10 until the lugs 26 on gland 9 are beneath lugs 27 of gland 10, and then rotating the gland 9 90° so that corresponding segments of the lugs are axially opposed to each other. Such assembly is permitted by the spacing of the lugs circumferentially as shown in FIG. 3.

A similar arrangement of lugs is provided between glands 10 and 11 to prevent axial separation of these glands. It will of course be appreciated that gland 10 could be lifted by other suitable supports when the gland 9 is withdrawn to a position close to the upper end of gland 10.

After the glands are assembled one within the other, guide bars 17' are welded in position with rod 17 extending through this guide arrangement to prevent rotation of intermediate gland 10.

Figure 6:
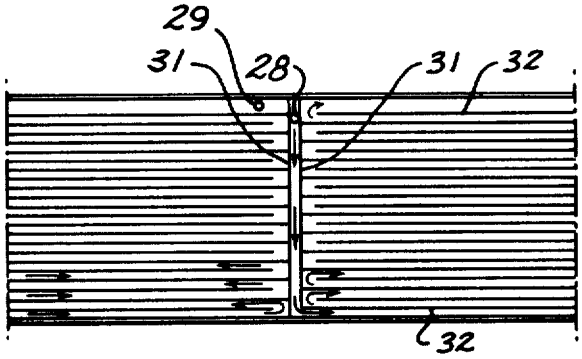
FIG. 6 shows the lay-out in plan of the cooling passage baffle arrangement of the glands.

As shown in FIGS. 1 and 6 each gland is water cooled with cooling water fed through its inlet pipe 28, and which exits from the gland through the outlet pipe 29. Suitable flexible hoses (not shown) are connected to the inlet and outlet pipes 28, 29 to provide forced circulation of the liquid coolant.

To provide more effective and uniform cooling, each gland has between its inner and outer walls 12 and 13, an arrangement of baffles 30 which direct the flow of cooling water between inlet 28 and outlet 29. A pair of vertical baffles 31 direct water from inlet 28 to the bottom of the gland, and staggered circumferential baffles 32 cause the water to flow circumferentially, upwardly, and then circumferentially in the opposite direction until the water ultimately reaches outlet 29. This provides excellent and efficient cooling in each gland.

As shown at FIG. 2, a handling lug 50 in the form of an ear having an opening therein is secured to the outside of gland 11. There are four such lugs on the outside of gland 11 spaced equally from each other, and circumferentially offset from the stop bar 17 and the inlet and outlet pipe of each gland. Further, an inverted U-shaped bracket 58 is connected at spaced apart circumferential locations on the seal ring 7, the opening in the bracket receiving arms 60 secured to and projecting outwardly from gland 11 near its bottom. The lugs 60 and openings in brackets 58 permit some lateral and circumferential movement of gland 11 with respect to seal ring 7.

With reference to FIG. 2, it will be noted that the opening 62 in seal ring 7 is only slightly greater than the diameter of the electrode 4 and correspondingly, provides a water cooled shield to block some radiation from the inside of the furnace. The bottom surface 64 of ring 7 is preferably slidable on the top surface of the water cooled ring 66. This provides for further lateral movement of the telescoping seal assembly and the electrode. It will further be noted from FIG. 2, that when the electrode is lowered to the point where the telescoping gland sections are in the position shown at the right hand side of FIG. 2, further sealing is attained between the bottom surfaces of the glands 9 and 10, and the top surface of the seal ring 7. More significant, as the glands 9 and 10 telescope within gland 11, these glands shield the inside surface of the gland 11 which facilitates cooling this gland which is normally the one which receives the most heat from the furnace and the electrode.

During operation of the furnace, it is necessary to continually adjust the electrode vertically to maintain proper operating conditions in the furnace, by correspondingly adjusting the length of the arc between the end of the electrode and the melt in the furnace. Further, the bottom of the electrode erodes, which requires moving the electrode downwardly to maintain the required arc length. The telescopic seal assembly 6 permits all such movement as well as lateral movement of the electrode when required, yet maintains an effective seal between the inside and outside of the furnace. Further, the packing or seals 18, and 18A, tend to absorb some of the vibration of the electrode.

Where each of the glands shown at FIGS. 1 and 2 is approximately 2' high, the arrangement shown permits vertical movement of the electrode by a distance of over 3', without the need for adjusting the electrode relative to the shoe 14. This has been found to be sufficient vertical movement during normal operation.

The seal arrangement shown and described can withstand pressures substantially greater than those usually encountered during operation of the furnace. Further, good sealing is attained even if the pressure in the furnace is lowered to below atmospheric pressure, so that a negative pressure can be maintained in the furnace if desired.

By virtue of the construction shown and described, the several seals are easy to install and replace, and the assembly itself is reliable and long lasting, thereby reducing to a minimum the required maintenance for the seal arrangement.

Figure 7:
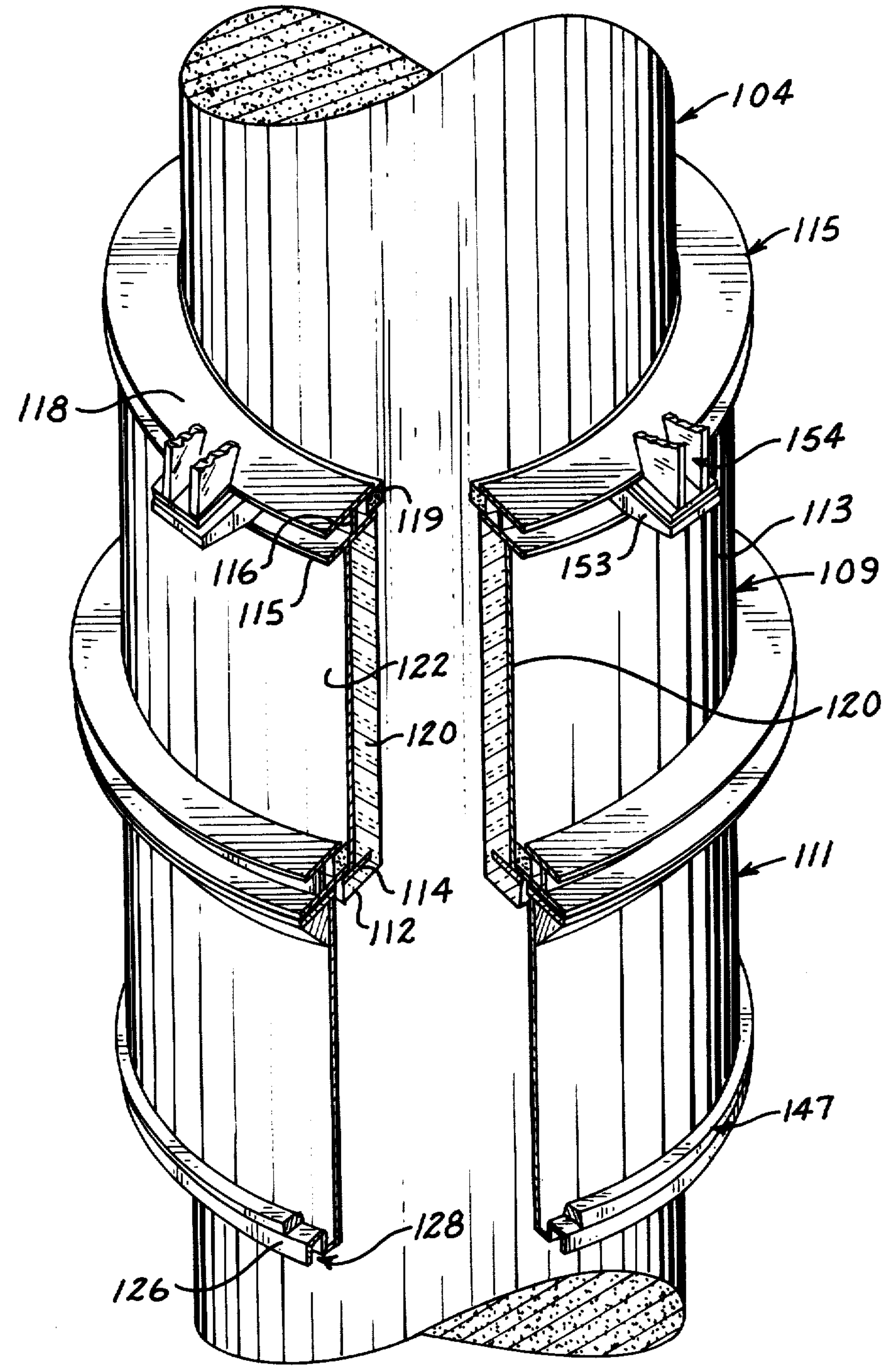
FIG. 7 is a pictorial view of a second embodiment, according to the invention.
Figure 8:
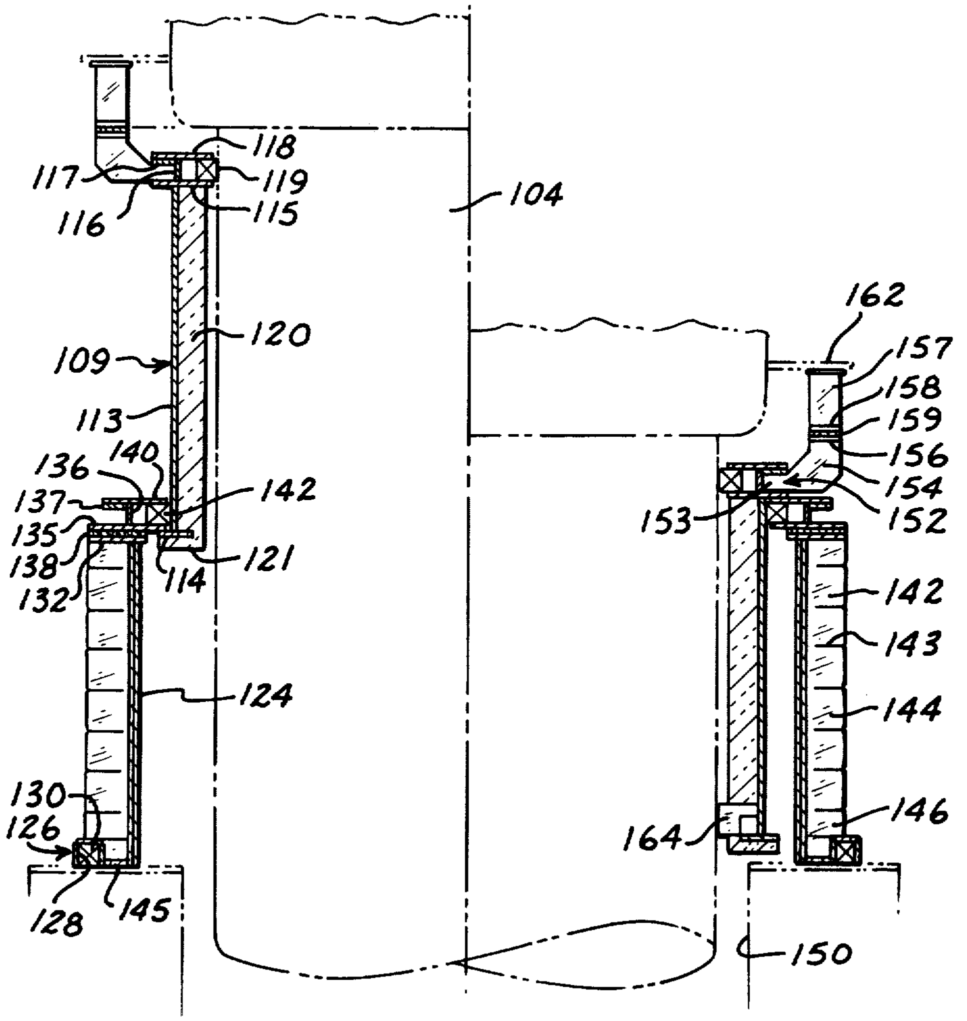
FIG. 8 is a front view in elevation and partly in section of the embodiment of FIG. 7.

FIGS. 7 and 8 show a second embodiment of seal according to this invention.

Shown at FIGS. 7 and 8 are a furnace electrode 104, an upper gland 109, and a lower gland 111. These upper and lower glands 109 and 111 cooperate to provide a telescopic assembly which effectively seals the furnace electrode 104 relative to the furnace while permitting the electrode to be raised and lowered. Upper gland 109 is of fabricated construction and is composed of a cylindrical side wall 113 formed from metal plate, a bottom flange 114 in the form of a metal ring, and an upper flange or ring 115. Flanges 114 and 115 are each welded to the ends of wall 113.

Welded to the top of flange 115 is a cylindrical wall 116 of short vertical height to which in turn is welded a ring 117 to provide an outwardly facing annular space. There is also a top ring 118 which is diametrically split to facilitate assembly and which is bolted to ring 117.

The inwardly facing annular recess between rings 115 and 118 defines a seat for a seal element 119 which is urged circumferentially inwardly into sealing engagement with the outside surface of electrode 104 by a strap and spring arrangement such as that shown at FIG. 5 for seal 18.

The inside surface of wall 113 is covered with a relatively thick layer of thermal insulation 120, which can be fibofrax. This layer of insulation is of such thickness that it terminates just short of the inner edge of ring 115, and extends the length of upper gland 109. At the bottom of the gland, the insulation is supported by bottom ring 114 which extends inwardly a distance less than upper ring 115. The insulation can extend across the bottom of bottom ring 114, as shown at 121 to protect the ring against direct heat from the furnace. The outer face of wall 113 presents a smooth seal surface 122 against which a seal of lower gland 111 engages.

Lower gland 111 is also of fabricated construction and includes a bottom ring assembly 126 of fabricated metal which defines a downwardly opening annular recess 128 and in which is seated a bottom seal element 130. Welded to the upper end of side wall 124 is an upper ring 132. Seated on and secured to ring 132 is a seal support assembly 134 composed of a ring 135 welded to a short sidewall 136 to which in turn is welded a ring 137. This assembly is preferably diametrically split for ease of assembly. Seal support assembly 134 is connected to ring 132 in both thermally and electrically insulating relation to the remainder of lower gland 111. This is accomplished by interposing a layer of insulation 138 between the assembly and ring 132, and by then bolting the assembly to the ring using thermally and electrically insulating sleeves and washers to insulate the bolts.

A top ring 140 cooperates with ring 135 to provide inwardly opening annular space in which a seal element 142 is mounted. Ring 140 is diametrically split and is bolted to ring 137. This permits removing the ring to service seal 142. Seal 142 is urged inwardly by a spring and strap arrangement like that shown at FIG. 5 for seal 18, and the vertical dimensions of the groove in which seal 142 is seated, is the same as that described for the embodiment of FIG. 5.

Lower gland 111 can have either the form shown at FIG. 7 where the outside surface of sidewall 124 is smooth, or alternatively, can take the form shown at FIG. 8 in which the exterior of wall 124 is provided with a series of vertical cooling fins 142. These fins can for example take the form of flat strips of metal which are provided with slits 143. If desired alternate ones of the individual fins so defined can be bent in opposite directions. The several strips which comprise the cooling fins extend generally radially and are attached to the outside wall 124 of the gland, for example, by welding. In the version shown at FIG. 8, the bottom ring assembly 126 includes a bottom ring 145 which is welded to the bottom of sidewall 124. In addition, the metal parts which define recess 128 can be welded to the lowermost fin such as the fin designated 146 at FIG. 8.

In the version shown at FIG. 7, the metal elements which form the recess 128 are reinforced by an additional reinforcing ring 147. In both versions, however, a seal element 130 is fitted into recess 128 and seals against the upper face of a seal surface 149 which surrounds the furnace opening 150.

Upper gland 109 is supported for movement with electrode 104, in a manner which can be identical to that shown at FIG. 2 for upper gland 9. However, the alternative arrangement shown at FIG. 8 can also be used. In the arrangement shown at FIG. 8, the metal elements 115–117 form an outwardly opening annular recess 152. Extending into this recess (preferrably at four equally circumferentially spaced locations) are foot portions 153 of L-shaped support brackets 154. These support brackets are preferrably fabricated by welding, and include an upper horizontal plate 156 of relatively small horizontal extent. A support arm 157 includes a lower plate 158 via which bracket 154 is bolted to arm 157. Interposed between the plates 156 and 158 is an electrically insulating sheet 159 and the bolted connection includes electrically insulating sleeves and washers so that bracket 154 as well as upper gland 109 is in electrically insulated relation to support arm 157. The upper end of support arm 157 is welded to the electrode shoe clamp 162 which functions as disclosed in the embodiment of FIG. 2 to support the electrode as well as to provide electrical current to the electrode.

The embodiment of FIGS. 7 and 8 finds particular utility in electric furnaces in which very high temperatures from the interior of the furnace are not transmitted to the region of the electrode outside the furnace. These embodiments also can be used to great advantage where there is either insufficient space for water cooled glands of the type shown in FIG. 2, as well as where the arrangement of equipment of the furnace roof does not demand relatively low temperatures.

It has been found that, depending on furnace conditions, a lower gland such as that shown in FIG. 7, without cooling fins, is not damaged, due to the cooling of sidewall 124 with natural convection currents. Where temperatures are higher and where additional cooling is required, the fins 142, 144 of FIG. 8 can be provided of the lower gland. Further, where radiation is intense, either upper gland 109 or lower gland 111 can be water-cooled, in which instance, the gland would have the internal water cooling passage arrangement previously described with reference to FIG. 6.

In the embodiment of FIGS. 7 and 8, the fibofrax insulation around the interior of gland 109 protects the interior of the upper gland and also reduces the temperature at its outside surface 122 to avoid damage to this surface which functions as the seal surface against which seal 142 engages. The prevention of damage to surface 122 is vital since upper gland 109 moves with electrode 104, and heat damage to this surface would quickly cause seal 142 to be abrated or worn.

It is further to be appreciated that in the embodiment of FIGS. 7 and 8 upper gland 109 is electrically neutral in that it is insulated electrically from both the lower gland 111 and the upper support arm 157. This electrically neutral arrangement minimizes any chances of arcing or sparking between the electrode and upper gland 109 which has portions thereof closely adjacent to the electrode.

The embodiment of FIGS. 7 and 8 finds utility and application in furnaces in which the water cooled embodiment of FIG. 2 cannot be used for various reasons. An additional significant advantage of the embodiment of FIGS. 7 and 8 is that these embodiments wholly avoid any possibility that water may enter the furnace as a result of either gland body failure or plumbing failure in the lines which supply water to the embodiment of FIG. 2.

Of course, the metal parts of the glands and seals of the arrangements of FIGS. 7 and 8 are made from stainless steel of some other high temperature resistant non-magnetic material, to minimize high temperature damage and to avoid the affects of induction heating.

While preferred embodiments of the furnace seal of this invention have been described with respect to an opening of an electric furnace through which an electrode extends, it will of course be evident that this telescopic seal arrangement either in the water cooled form of FIG. 2 or the form of FIGS. 7 and 8 can be used as a seal for furnaces or other apparatus for purposes other than sealing with respect to an electrode opening. For example, delivery chutes for delivering materials to a furnace frequently require insertion and retraction, and such chutes can be sealed with the seal assembly according to this invention. It will of course be appreciated that virtually any element or assembly which in use requires relative movement with respect to a furnace or other high temperature environment can be effectively sealed to prevent escape of furnace gases, using the seal arrangements described herein.

It is also believed evident from the preceeding that the several seal such as 119,142, and 130 provide sufficient flexibility and lateral movement with respect to each other to permit some lateral misalignment of the axis of, for example, a furnace electrode or duct, and also permits some lateral movement which avoids failure in the event of vibration and other shock or impact, even at high temperatures.

Glands 109 and 111 can each be of diametrically split construction so that they can be assembled around the electrode. For the lower gland the joint can be formed by two vertical plates or flanges like the fin strips 144, and which are bolted together at the diametral interface. For upper glands which must have a smooth seal surface such as surface 122, rabbited lap joints are used and flat head bolts extend through counter-sink openings along the lap so that the heads are recessed. This provides the required smooth seal surface 122.

To prevent damage to the insulation 120 at the inside of gland 109, when the electrode 104 is slipped down after its lower end erodes, guide shoes 164 can be provided at circumferentially spaced locations adjacent the lower end of upper gland 109, as shown at FIG. 8. These shoes 164 extend slightly inwardly of the inside surface of isulation 120 and prevent the electrode from rubbing on the insulation as the electrode is periodically slipped down relative to the upper gland.

While several preferred embodiments have been shown and described, it will of course be evident to one skilled in the art that numerous changes can be made without departing from the scope of this invention.

What is claimed is:

1. In an electrode furnace of the type in which an electrode extends through an opening in the furnace, an electrode seal assembly to seal the electrode relative to the furnace, said seal assembly comprising:

a plurality of different diameter axially telescopically slidable glands surrounding said electrode, said plurality of glands including a lower gland and and upper gland;

slidable mechanical seal means between said upper gland and said lower gland for sealing between said glands during relative axial movement, said seal means comprising a circumferential seal carried by an outer gland and sealing against an exterior surface of an adjacent inner gland;

means supporting said upper gland for movement with the electrode;

seal means for sealing said upper gland with respect to said electrode; and means sealing said lower gland relative to said furnace opening.

2. A furnace electrode seal assembly according to claim 1, wherein said plurality of glands further comprises, at least one intermediate gland between said upper gland and said lower gland, said intermediate gland having an exterior seal surface engaged by a seal of an adjacent outer gland, and a circumferential seal engaging an exterior seal surface of an adjacent inner gland.

3. A furnace electrode seal assembly according to claim 1 wherein at least one of said glands comprises an annular body.

4. A furnace electrode seal assembly according to claim 3, wherein the gland of largest diameter comprises exterior cooling fins.

5. A furnace electrode seal assembly according to claim 1, wherein said circumferential seal comprises a seal ring of relatively high temperature resistant material and means for urging said ring into tight sealing engagement against the exterior surface of said adjacent inner gland.

6. A furnace electrode seal assembly according to claim 3, further comprising means mounting said seal rings for limited radial movement so that said glands can move laterally relative to each other during lifting and lowering of the electrode.

7. A furnace seal assembly according to claim 1, further comprising a layer of high temperature resistant insulation between the innermost one of said glands and the outer surface of said electrode.

8. A furnace seal assembly according to claim 1, wherein an electrode shoe extends around said electrode at a location above said upper gland;

said means connecting said upper gland to said electrode comprises means suspending said upper gland from said electrode shoe; and said sealing means for sealing said upper gland with respect to said electrode comprises a seal ring between said upper gland and the exterior of said electrode.

9. A furnace seal assembly according to claim 8, wherein said seal ring between said upper gland and said electrode comprises a radially movable seal ring.

10. A furnace seal assembly according to claim 8 further comprising, means for electrically insulating said upper gland from said electrode shoe.

11. A furnace seal assembly according to claim 2, further comprising means on said upper gland for lifting said intermediate gland during upward movement of said electrode.

12. A furnace seal assembly according to claim 1, wherein said glands are of successively increasing diameter from said upper gland to said lower gland, so that the inner surface of the upper gland shields the inner surface of the lower gland as the electrode is lowered.

13. A furnace seal assembly according to claim 2, wherein said glands are of successively increasing diameter from said upper gland to said lower gland so that, as said electrode is lowered, inner surfaces of said intermediate gland and upper gland shield the interior of the lower gland.

14. In an apparatus in which an element extends through an opening in the apparatus, a seal assembly to seal the element with respect to the apparatus during movement thereof relative to the apparatus, said seal assembly comprising:

a plurality of different diameter axially telescopically slidable glands surrounding said element, said plurality of glands including an inner gland and an outer gland;

slidable mechanical seal means between said inner gland and said outer gland for sealing between said glands during relative axial movement, said seal means comprising a circumferential seal carried by an outer gland and sealing against an exterior surface of an adjacent inner gland;

means supporting one of said glands for movement with the element;

seal means for sealing one of said glands with respect to said element; and means sealing another of said glands relative to said opening.

15. Apparatus according to claim 14 wherein, said element comprises a furnace electrode.

16. Apparatus according to claim 14, wherein said element comprises an inlet chute for feeding material into the furnace.

* * * * *